United States Patent Office 3,297,764
Patented Jan. 10, 1967

3,297,764
ALKYLMERCAPTO SUBSTITUTED ACYLATED POLYALKYLTETRAHYDRONAPHTHALENES AND PROCESS FOR PREPARING SAME
Robert Lusskin, Haworth, and Joseph Levy, Paramus, N.J., assignors to Universal Oil Products Company, Des Plaines, Ill., a corporation of Delaware
No Drawing. Filed June 22, 1964, Ser. No. 377,051
12 Claims. (Cl. 260—592)

This invention relates to new compositions of matter and to a process for their preparation. More particularly this invention relates to alkylmercapto substituted acylated polyalkyltetrahydronaphthalenes.

The alkylmercapto substituted, acylated polyalkyltetrahydronaphthalenes of this invention have many valuable properties, one of which is a musk-like odor making these compounds extremely useful in the perfume industry. Compounds having musk-like odors are valuable in perfumery because in addition to their odor, they generally have fixative and blending properties useful in perfume formulating. The most valuable of these compounds are the macrocyclic musks which are organic compounds having 15 to 18 carbon atoms in an alicyclic ring such as muskone, civetone, pentadecanolide or ethylene brassylate. These macrocyclic compounds, however, are not readily available because they either have to be extracted from not readily available natural sources or must be synthesized by difficult and complicated chemical processes. Accordingly, many types of compounds have been prepared which have musk-like odors as substitutes for the macrocyclic musks. One class of these compounds is known as nitro musks which are relatively easy to prepare and inexpensive, but generally have harsh odors. Another class of these compounds are acylated polyalkyltetrahydronaphthalenes which possess extremely fine musk-like odors. The numerous compounds included within both of these classes generally do not contain sulfur substituents and it is, therefore, quite surprising that members of the class of new compounds of this invention which contain a sulfur substituent have musk-like odors.

An object of this invention is to provide a new class of compounds consisting of alkylmercapto substituted, acylated polyalkyltetrahydronaphthalenes. Another object of this invention is to provide alkylmercapto substituted, acylated polyalkyltetrahydronaphthalenes having a musk-like odor. A further object of this invention is to provide a process for preparing alkylmercapto substituted, acylated polyalkyltetrahydronaphthalenes.

One embodiment of this invention is a compound having the following structural formula:

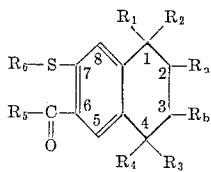

in which $R_1$, $R_2$, $R_3$, $R_4$, $R_5$ and $R_6$ are alkyl radicals selected from the group consisting of methyl and ethyl; and $R_a$ and $R_b$ are selected from the group consisting of hydrogen, methyl and ethyl.

Another embodiment of this invention is a process for the preparation of a compound having the following structural formula:

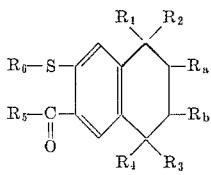

in which $R_1$, $R_2$, $R_3$, $R_4$, $R_5$ and $R_6$ are alkyl radicals selected from the group consisting of methyl and ethyl; and $R_a$ and $R_b$ are selected from the group consisting of hydrogen, methyl and ethyl; which comprises: (A) reacting a dialkyldisulfide selected from the group consisting of dimethyldisulfide and diethyldisulfide in the presence of a catalyst with a polyalkyltetrahydronaphthalene having the following structural formula:

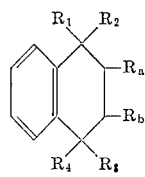

in which $R_1$, $R_2$, $R_3$ and $R_4$ are alkyl radicals selected from the group consisting of methyl and ethyl; and $R_a$ and $R_b$ are selected from the group consisting of hydrogen, methyl and ethyl; (B) reacting the alkylmercapto substituted polyalkyltetrahydronaphthalene thus obtained with an acyl halide selected from the group consisting of acetyl halide and propionyl halide in the presence of a catalyst; and (C) recovering the desired compound.

Further objects and embodiments of this invention will appear from a further detailed description thereof.

As hereinbefore set forth this invention relates to alkylmercapto substituted, acylated polyalkyltetrahydronaphthalenes as a new class of chemical compounds. Examples of these compounds include 1,1,4,4-tetramethyl-6-acetyl-7-methylmercapto - 1,2,3,4-tetrahydronaphthalene; 1,1,2,4,4-pentamethyl-6-acetyl - 7 - methylmercapto-1,2,3, 4 - tetrahydronaphthalene; 1,1,2,3,4,4 - hexamethyl - 6-acetyl - 7-methylmercapto - 1,2,3,4 - tetrahydronaphthalene; 1,1,4,4-tetramethyl-2-ethyl-6-propionyl - 7 - methylmercapto - 1,2,3,4 - tetrahydronaphthalene; or 1,4-diethyl-1,4-dimethyl-6-acetyl - 7 - ethylmercapto-1,2,3,4-tetrahydronaphthalene.

As indicated above, besides having other valuable properties such as being useful as intermediates in the preparation of other compounds, the compounds of this invention possess a musk-like odor which is quite surprising because previously prepared synthetic musk compounds which have musk-like odors generally do not contain sulfur substituents. Moreover, the musk-like odor of the compounds of this invention is quite unexpected because it is well known that alkylmercapto substituted compounds generally have strongly obnoxious odors which are quite different from the sweet, pleasant, musk-like odor of the alkylmercapto substituted tetrahydronaphthalenes of this invention.

While the compounds embraced within the class of compounds of this invention can have a maximum of 27 carbon atoms per molecule, the compounds which possess the strongest musk-like odor generally have less than 20 carbon atoms per molecule and preferably from 17 to 18 carbon atoms per molecule, an example of which is 1,1,4,4-tetramethyl - 6-acetyl-7-methylmercapto-1,2,3,4-tetrahydronaphthalene.

The new compositions of matter of this invention can be prepared by reacting a dialkyldisulfide with a polyalkyltetrahydronaphthalene in the presence of a catalyst followed by acylation of the alkylmercapto substituted polyalkyltetrahydronaphathalene thus obtained with a acyl halide in the presence of a catalyst.

In reacting the dialkyldisulfide with the polyalkyltetrahydronaphthalene, the dialkyldisulfide used is either dimethyl- or diethyl-disulfide depending upon whether the methyl- or the ethyl-mercapto substituted tetrahydronaphthalene is desired. The polyalkyltetrahydronaphthalene used in the reaction has the following structural formula:

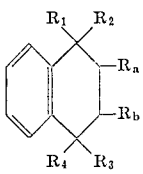

in which $R_1$, $R_2$, $R_3$ and $R_4$ are alkyl radicals selected from the group consisting of methyl and ethyl; $R_a$ and $R_b$ are selected from the group consisting of hydrogen, methyl and ethyl.

The polyalkyltetrahydronaphthalene may be prepared by condensing benzene in the presence of a suitable condensing agent such as aluminum chloride with a halo and alkyl substituted aliphatic hydrocarbon such as a 2,5-dichloro-2,5-dialkylhexane derivative, and particularly 2,5-dichloro-2,5-dimethylhexane when a tetrahydronaphthalene having $R_1$, $R_2$, $R_3$ and $R_4$ as methyl is desired. Examples of polyalkyltetralins suitable for reaction with the dialkyldisulfide according to this invention include 1,1,4,4-tetramethyl - 1,2,3,4 - tetrahydronaphthalene; 1,1,2,4,4-pentamethyl - 1,2,3,4 - tetrahydronaphthalene; 1,1,2,3,4 - hexamethyl-1,2,3,4-tetrahydronaphthalene; 1,1,4,4 - tetramethyl-2-ethyl - 1,2,3,4 - tetrahydronaphthalene; 1,1,4,4-tetraethyl - 1,2,3,4 - tetrahydronaphthalene; or 1,4-dimethyl-1,4-diethyl-1,2,3,4-tetrahydronaphthalene.

The conditions utilized in reacting the dialkyldisulfide with the polyalkyltetrahydronaphthalene are not critical and may be widely varied. Generally, the disulfide and the tetrahydronaphthalene may be reacted in stoichiometric ratios, at temperatures of about 25° C. or higher and for from about 10 to 30 hours or more. The use of a catalyst is, however, necessary in conducting the reaction and generally Friedel-Crafts catalysts are used. Such catalysts include metal halides such aluminum-, zinc-, ferric- or stannic chlorides and are used in approximately molar ratios to the moles of tetrahydronaphthalene present.

The alkylmercapto substituted polyalkyltetrahydronaphthalene prepared by reacting the dialkyldisulfide with the polyalkyltetrahydronaphthalene is then acylated by reacting it with an acyl halide in the presence of a catalyst. The acyl halide may be either acetyl or propionyl halide depending upon whether an acetyl or propionyl substituted alkylmercapto polyalkyltetrahydronaphthalene is desired. Generally, acyl chlorides are used in the reaction because of their ready availability.

The conditions under which the acylation is conducted are not critical and may be widely varied. Generally, the acyl halide and the alkylmercapto substituted polyalkyltetrahydronaphthalene may be reacted in stoichiometric ratios, at temperatures from about 0° or lower to about 25° C. or higher for from 0.5 to 5 hours or more. The use of a catalyst is, however, necessary in conducting the reaction and preferably Friedel-Crafts catalysts are used. Such catalysts include metal halides such as aluminum-, ferric-, zinc- or stannic chlorides and are used in varying amounts depending upon the particular reaction rate desired; with an equal molar ratio of catalysts to acyl halide being satisfactory in most instances. A preferred manner of effecting the acylation is to conduct the reaction in the presence of a solvent such as ethylene dichloride.

The following examples are given to illustrate the compositions of matter and their method of preparation which, however, are not intended to limit the generally broad scope of the present invention in strict accordance therewith:

*Example I*

1,1,4,4-tetramethyl - 6 - acetyl-7-methylmercapto-1,2,3,4-tetrahydronaphthalene was prepared according to the process of this invention by charging 37.6 grams (0.2 mole) of 1,1,4,4-tetramethyl-1,2,3,4-tetrahydronaphthalene, 4.7 grams (0.05 mole) of dimethyldisulfide and 13.3 grams (0.1 mole) of aluminum chloride to a reaction flask equipped with a thermometer and stirring means. The mixture was stirred at about 25° C. for about 23 hours, at which time the mixture was poured with stirring onto about 200 grams of ice. As the ice melted, an aqueous layer and an organic layer formed and the aqueous layer was separated and any soluble organic material contained therein extracted with about 90 grams of benzene. The benzene extract was then combined with the organic layer and distilled to remove the benzene. The residue was fractionated to recover 7.0 grams of 1,1,4,4-tetramethyl - 7 - methylmercapto-1,2,3,4-tetrahydronaphthalene. A 4.68 gram (0.02 mole) sample of the methylmercapto substituted polyalkyltetrahydronaphthalene thus prepared was acetylated by adding it to a reaction flask containing 2.26 grams (0.029 mole) of acetyl chloride and 31 grams of ethylene dichloride. The flask was cooled in an ice bath and 5.32 grams (0.04 mole) of aluminum chloride were added over a period of about five minutes. The resultant mixture was stirred for about 1.5 hours during which time the temperature rose to about 25° C. The entire contents of the flask were then poured with stirring onto about 150 grams of ice. As the ice melted, an aqueous layer and an organic layer formed and the aqueous layer was separated and any soluble organic material contained therein extracted with about 50 grams of ethylene dichloride. The ethylene dichloride extract was then combined with the organic layer and washed with about 50 grams of water. The resultant, washed organic mixture was filtered and evaporated to obtain 5.0 grams of a heavy oil which solidified upon cooling. The solids were recrystallized twice from methanol to give 1.8 grams of 1,1,4,4-tetramethyl-6-acetyl - 7 - methylmercapto-1,2,3,4-tetrahydronaphthalene having a melting point of 94.4° to 97.0° C. This material had a musk-like odor.

*Example II*

1,1,2,4,4-pentamethyl - 6 - acetyl-7-methylmercapto-1,2,3,4-tetrahydronaphthalene is prepared according to the process of this invention by charging 39.8 grams (0.2 mole) of 1,1,2,4,4-pentamethyl-1,2,3,4-tetrahydronaphthalene, 4.7 grams (0.05 mole) of dimethyldisulfide and 13.3 grams (0.1 mole) of aluminum chloride to a reaction flask equipped with a thermometer and stirring means. The mixture is stirred at about 25° C. for about 23 hours, at which time the mixture is poured with stirring onto about 200 grams of ice. As the ice melts, an aqueous layer and an organic layer form and the aqueous layer is separated and any soluble organic material contained therein extracted with about 90 grams of benzene. The benzene extract is then combined with the organic layer and distilled to remove the benzene. The residue is fractionated to recover the 1,1,2,4,4-pentamethyl-7-methylmercapto - 1,2,3,4 - tetrahydronaphthalene. Four and ninety-six hundredths grams (0.02 mole) of the methylmercapto substituted polyalkyltetrahydronaphthalene thus prepared is then acetylated by adding it to a reaction flask containing 2.26 grams (0.029 mole) of acetyl chloride and 31 grams of ethylene dichloride. The flask is cooled in an ice bath and 5.32 grams (0.04 mole) of aluminum chloride are added over a period of about five minutes. The resultant mixture is stirred for about 1.5 hours during which time the temperature rises to about 25° C. The entire contents of the flask are then poured with stirring onto about 150 grams of ice. As the ice melts, an aqueous layer and an organic layer form and the aqueous layer is separated and any soluble organic material contained therein extracted with ethylene dichloride. The ethylene dichloride extract is then combined with the organic layer and washed with about 50 grams of water. The resultant, washed organic mixture is filtered and evaporated to obtain a heavy oil which solidifies upon cooling. The solids are recrystallized twice from methanol to obtain the 1,1,2,4,4-pentamethyl-6-acetyl - 7 - methylmercapto-1,2,3,4-tetrahydronaphthalene product.

*Example III*

1,1,2,3,4,4-hexamethyl - 6 - acetyl-7-methylmercapto-1,2,3,4-tetrahydronaphthalene is prepared according to the process of this invention by charging 43.2 grams (0.2 mole) of 1,1,2,3,4,4-hexamethyl-1,2,3,4-tetrahydronaphthalene, 4.7 grams (0.05 mole) of dimethyldisulfide and 13.3 grams (0.1 mole) of aluminum chloride to a reaction flask equipped with a thermometer and stirring means. The mixture is stirred at about 25° C. for about 23 hours, at which time the mixture is poured with stirring onto about 200 grams of ice. As the ice melts, an aqueous layer and an organic layer form and the aqueous layer is separated and any soluble organic material contained therein extracted with about 90 grams of benzene. The benzene extract is then combined with the organic layer and distilled to remove the benzene. The residue is fractionated to recover the 1,1,2,3,4,4-hexamethyl-7-methylmercapto-1,2,3,4-tetrahydronaphthalene. Five and twenty-four hundredths grams (0.02 mole) of the methylmercapto substituted polyalkyltetrahydronaphthalene thus prepared is then acetylated by adding it to a reaction flask containing 2.26 grams (0.029 mole) of acetyl chloride and 31 grams of ethylene dichloride. The flask is cooled in an ice bath and 5.32 grams (0.04 mole) of aluminum chloride are added over a period of about five minutes. The resultant mixture is stirred for about 1.5 hours during which time the temperature rises to about 25° C. The entire contents of the flask are then poured with stirring onto about 150 grams of ice. As the ice melts, an aqueous layer and an organic layer form and the aqueous layer is separated and any soluble organic material contained therein extracted with ethylene dichloride. The ethylene dichloride extract is then combined with the organic layer and washed with about 50 grams of water. The resultant, washed organic mixture is filtered and evaporated to obtain a heavy oil which solidifies upon cooling. The solids are recrystallized twice from methanol to obtain the 1,1,2,3,4,4-hexamethyl - 6 - acetyl-7-methylmercapto-1,2,3,4-tetrahydronaphthalene product.

*Example IV*

1,1,4,4-tetramethyl - 6 - acetyl-7-ethylmercapto-1,2,3,4-tetrahydronaphthalene is prepared according to the process of this invention by charging 37.6 grams (0.2 mole) of 1,1,4,4-tetramethyl-1,2,3,4-tetrahydronaphthalene, 6.10 grams (0.05 mole) of diethyldisulfide and 13.3 grams (0.1 mole) of aluminum chloride to a reaction flask equipped with a thermometer and stirring means. The mixture is stirred at about 25° C. for about 23 hours, at which time the mixture is poured with stirring onto about 200 grams of ice. As the ice melts, an aqueous layer is separated and any soluble organic material contained therein extracted with about 90 grams of benzene. The benzene extract is then combined with the organic layer and distilled to remove the benzene. The residue is fractionated to recover the 1,1,4,4-tetramethyl-7-ethylmercapto-1,2,3,4-tetrahydronaphthalene. Four and ninety-six hundredths grams (0.02 mole) of the ethylmercapto substituted polyalkyltetrahydronaphthalene thus prepared is then acetylated by adding it to a reaction flask containing 2.26 grams (0.029 mole) of acetyl chloride and 31 grams of ethylene dichloride. The flask is cooled in an ice bath and 5.32 grams (0.04 mole) of aluminum chloride are added over a period of about five minutes. The resultant mixture is stirred for about 1.5 hours during which time the temperature rises to about 25° C. The entire contents of the flask are then poured with stirring onto about 150 grams of ice. As the ice melts, an aqueous layer and an organic layer form and the aqueous layer is separated and any soluble organic material contained therein extracted with ethylene dichloride. The ethylene dichloride extract is then combined with the organic layer and washed with about 50 grams of water. The resultant, washed organic mixture is filtered and evaporated to obtain a heavy oil which solidifies upon cooling. The solids are recrystallized twice from methanol to obtain the 1,1,4,4-tetramethyl - 6 - acetyl-7-ethylmercapto-1,2,3,4-tetrahydronaphthalene product.

*Example V*

1,1,4,4-tetramethyl-2-ethyl - 6 - propionyl-7-methylmercapto-1,2,3,4-tetrahydronaphthalene is prepared according to the process of this invention by charging 43.2 grams (0.2 mole) of 1,1,4,4-tetramethyl-2-ethyl-1,2,3,4-tetrahydronaphthalene, 4.7 grams (0.05 mole) of dimethyldisulfide and 13.3 grams (0.1 mole) of aluminum chloride to a reaction flask equipped with a thermometer and stirring means. The mixture is stirred at about 25° C. for about 23 hours, at which time the mixture is poured with stirring onto about 200 grams of ice. As the ice melts, an aqueous layer and an organic layer form and the aqueous layer is separated and any soluble organic material contained therein extracted with about 90 grams of benzene. The benzene extract is then combined with the organic layer and distilled to remove the benzene. The residue is fractionated to recover the 1,1,4,4-tetramethyl-2-ethyl-7-methylmercapto - 1,2,3,4 - tetrahydronaphthalene. Five and twenty hundredths grams (0.02 mole) of the methylmercapto substituted polyalkyltetrahydronaphthalene thus prepared is then acylated by adding it to a reaction flask containing 2.76 grams (0.029 mole) of propionyl chloride and 31 grams of ethylene dichloride. The flask is cooled in an ice bath and 5.32 grams (0.04 mole) of aluminum chloride are added over a period of about five minutes. The resultant mixture is stirred for about 1.5 hours during which time the temperature rises to about 25° C. The entire contents of the flask are then poured with stirring onto about 150 grams of ice. As the ice melts, an aqueous layer and an organic layer form and the aqueous layer is separated and any soluble material contained therein extracted with ethylene dichloride. The ethylene dichloride extract is then combined with the organic layer and washed with about 50 grams of water. The resultant, washed organic mixture is filtered and evaporated to obtain a heavy oil which solidifies upon cooling. The solids are recrystallized twice from ethanol to obtain the 1,1,4,4-tetramethyl - 2 - ethyl-6-propionyl - 7 - methylmercapto-1,2,3,4-tetrahydronaphthalene product.

We claim as our invention:

1. A compound having the following structural formula:

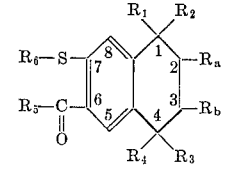

in which $R_1$, $R_2$, $R_3$, $R_4$, $R_5$ and $R_6$ are alkyl radicals selected from the group consisting of methyl and ethyl; and $R_a$ and $R_b$ are selected from the group consisting of hydrogen, methyl and ethyl.

2. 1,1,4,4 - tetramethyl-6-acetyl - 7 - methylmercapto-1,2,3,4-tetrahydronaphthalene.

3. 1,1,2,4,4-pentamethyl-6-acetyl - 7 - methylmercapto-1,2,3,4-tetrahydronaphthalene.

4. 1,1,2,3,4,4 - hexamethyl-6-acetyl-7-methylmercapto-1,2,3,4-tetrahydronaphthalene.

5. 1,1,4,4 - tetramethyl-6-acetyl - 7 - ethylmercapto-1,2,3,4-tetrahydronaphthalene.

6. 1,1,4,4-tetramethyl-2-ethyl-6-propionyl - 7 - methylmercapto-1,2,3,4-tetrahydronaphthalene.

7. Process for the preparation of a compound having the following structural formula:

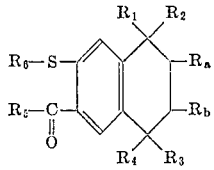

in which $R_1$, $R_2$, $R_3$, $R_4$, $R_5$ and $R_6$ are alkyl radicals selected from the group consisting of methyl and ethyl; and $R_a$ and $R_b$ are selected from the group consisting of hydrogen, methyl and ethyl; which comprises: (A) reacting a dialkyldisulfide selected from the group consisting of dimethyldisulfide and diethyldisulfide in the presence of a Friedel-Crafts catalyst with a polyalkyltetrahydronaphthalene having the following structural formula:

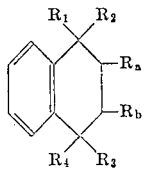

in which $R_1$, $R_2$, $R_3$ and $R_4$ are alkyl radicals selected from the group consisting of methyl and ethyl; and $R_a$ and $R_b$ are selected from the group consisting of hydrogen, methyl and ethyl; (B) reacting the alkylmercapto substituted polyalkyltetrahydronaphthalene thus obtained with an acyl halide selected from the group consisting of acetyl halide and propionyl halide in the presence of a Friedel-Crafts catalyst; and (C) recovering the desired compound.

8. Process for the preparation of 1,1,4,4-tetramethyl-6-acetyl-7-methylmercapto - 1,2,3,4 - tetrahydronaphthalene which comprises: (A) reacting dimethyldisulfide with 1,1,4,4-tetramethyl-1,2,3,4-tetrahydronaphthalene in the presence of a Friedel-Crafts catalyst; (B) reacting the methylmercapto substituted polyalkyltetrahydronaphthalene thus obtained with an acetyl halide in the presence of a Friedel-Crafts catalyst; and (C) recovering the desired product.

9. Process for the preparation of 1,1,2,4,4- pentamethyl-6-acetyl-7-methylmercapto - 1,2,3,4 - tetrahydronaphthalene which comprises; (A) reacting dimethyldisulfide with 1,1,2,4,4-pentamethyl-1,2,3,4-tetrahydronaphthalene in the presence of a Friedel-Crafts catalyst; (B) reacting the methylmercapto substituted polyalkyltetrahydronaphthalene thus obtained with an acetyl halide in the presence of a Friedel-Crafts catalyst; and (C) recovering the desired product.

10. Process for the preparation of 1,1,2,3,4,4-hexamethyl-6-acetyl-7-methylmercapto - 1,2,3,4 - tetrahydronaphthalene which comprises: (A) reacting dimethyldisulfide with 1,1,2,3,4,4-hexamethyl-1,2,3,4-tetrahydronaphthalene in the presence of a Friedel-Crafts catalyst; (B) reacting the methylmercapto substituted polyalkyltetrahydronaphthalene thus obtained with an acetyl halide in the presence of a Friedel-Crafts catalyst; and (C) recovering the desired product.

11. Process for the preparation of 1,1,4,4-tetramethyl-6 - acetyl-7-ethylmercapto-1,2,3,4-tetrahydronaphthalene which comprises: (A) reacting diethyldisulfide with 1,1,4,4-tetramethyl-1,2,3,4-tetrahydronaphthalene in the presence of a Friedel-Crafts catalyst; (B) reacting the ethylmercapto substituted polyalkyltetrahydronaphthalene thus obtained with an acetyl halide in the presence of a Friedel-Crafts catalyst; and (C) recovering the desired product.

12. Process for the preparation of 1,1,4,4-tetramethyl-2-ethyl-6-propionyl-7-methylmercapto - 1,2,3,4 - tetrahydronaphthalene which comprises: (A) reacting dimethyldisulfide with 1,1,4,4-tetramethyl-2-ethyl-1,2,3,4-tetrahydronaphthalene in the presence of a Friedel-Crafts catalyst; (B) reacting the methylmercapto substituted polyalkyltetrahydronaphthalene thus obtained with a propionyl halide in the presence of a Friedel-Crafts catalyst; and (C) recovering the desired product.

References Cited by the Examiner
UNITED STATES PATENTS 2,897,237    7/1959    Carpenter et al. _____ 260—592

LEON ZITVER, *Primary Examiner.*

DANIEL D. HORWITZ, *Examiner.*